(12) United States Patent
Miyajima et al.

(10) Patent No.: US 9,212,780 B2
(45) Date of Patent: *Dec. 15, 2015

(54) CONTROL VALVE (71) Applicant: YAMADA MANUFACTURING CO., LTD, Kiryu-shi (JP)

(72) Inventors: Junichi Miyajima, Isesaki (JP); Hidehiko Koyashiki, Isesaki (JP); Takatoshi Watanabe, Isesaki (JP)

(73) Assignee: YAMADA MANUFACTURING CO., LTD., Kiryu-Shi, Gunma (JP)

( * ) Notice: Subject to any disclaimer, the term of this patent is extended or adjusted under 35 U.S.C. 154(b) by 279 days.

This patent is subject to a terminal disclaimer.

(21) Appl. No.: 13/934,098

(22) Filed: Jul. 2, 2013

(65) Prior Publication Data

US 2014/0007965 A1   Jan. 9, 2014

(30) Foreign Application Priority Data

Jul. 6, 2012   (JP) .................................. 2012-152447

(51) Int. Cl.
*F01M 1/02*   (2006.01)
*F16N 25/02*   (2006.01)
*F01M 1/16*   (2006.01)

(52) U.S. Cl.
CPC ................. *F16N 25/02* (2013.01); *F01M 1/02* (2013.01); *F01M 1/16* (2013.01); *Y10T 137/8671* (2015.04)

(58) Field of Classification Search
CPC ............ F01M 1/12; F01M 1/16; F01M 11/02
USPC ............................ 123/196 R, 196 CP, 196 M
See application file for complete search history.

(56) References Cited

U.S. PATENT DOCUMENTS

| 5,085,181 | A * | 2/1992 | Feuling ..................... 123/90.12 |
| 6,443,263 | B1 * | 9/2002 | Ito et al. ........................ 184/6.5 |
| 9,038,659 | B2 * | 5/2015 | Watanabe et al. ............. 137/495 |
| 2005/0142006 | A1 * | 6/2005 | Voigt ........................ 417/410.4 |
| 2011/0067667 | A1 * | 3/2011 | Miyachi et al. ........... 123/196 R |
| 2011/0067668 | A1 * | 3/2011 | Miyachi et al. ........... 123/196 R |
| 2011/0232594 | A1 * | 9/2011 | Miyachi et al. ............ 123/90.15 |

FOREIGN PATENT DOCUMENTS

JP   2009-264241 A   11/2009

OTHER PUBLICATIONS

United States Office Action dated Jun. 16, 2015 in co-pending U.S. Appl. No. 13/934,111.

* cited by examiner

*Primary Examiner* — Craig Schneider
*Assistant Examiner* — Daniel P Donegan
(74) *Attorney, Agent, or Firm* — McGinn IP Law Group, PLLC (57) ABSTRACT

A control valve have a main flow passage; a flow passage sectional area adjustment spool; a downstream side branch flow passage; a communicating flow passage; a flow passage opening/closing valve; a flow passage opening/closing spool; and an upstream side branch flow passage. The flow passage opening/closing valve cuts off the downstream side branch flow passage from the communicating flow passage in a low rotation region of an engine. In a medium rotation region, the flow passage opening/closing valve connects the downstream side branch flow passage to the communicating flow passage and the flow passage opening/closing spool allows the communicating flow passage to communicate. In a high rotation region, the flow passage opening/closing spool blocks the communicating flow passage.

11 Claims, 6 Drawing Sheets

ENLARGEMENT OF (β) PORTION

Fig.4A

Fig.4B ENLARGEMENT OF (γ) PORTION

CONTROL VALVE

BACKGROUND OF THE INVENTION

1. Field of the Invention

The present invention relates to a control valve for regulating an oil pressure supplied to respective flow passages in a lubricating oil supply apparatus of an engine, or more particularly a lubricating oil supply apparatus including a valve system supply flow passage for delivering lubricating oil to a cam journal and so on of a cylinder head, and a crankshaft system supply flow passage for delivering lubricating oil to a crankshaft, a connecting rod, and so on of a cylinder block.

2. Description of the Related Art

Attempts have been made in the past to vary an oil pressure of oil supplied from an oil pump in accordance with a rotation speed of an engine so that the oil is supplied at an optimum oil pressure for respective rotation speed regions. Attempts have also been made to lighten a load of the oil pump by regulating the oil pressure supplied to a valve system lubricating circuit and a crankshaft system lubricating circuit to an oil pressure required by each circuit.

To achieve such objects, an invention (to be referred to hereafter as "the invention according to Patent Document 1") disclosed in Japanese Patent Application Publication No. 2009-264241 (Patent Document 1) has been proposed. The invention according to Patent Document 1 will be described briefly below. Reference symbols used in the description are identical to those used in Patent Document 1. First, oil is drawn from an oil pan 10 by an oil pump 12 and delivered to a first oil feeding path 16a and a second oil feeding path 16b.

The first oil feeding path 16a is a path for supplying the oil mainly to a bearing portion 18 of a crankshaft, while the second oil feeding path 16b is a path for supplying the oil to a valve mechanism 20 and so on, for example. An oil pressure control valve 22 for controlling an amount of oil supplied to the bearing portion 18 of the crankshaft is disposed on the first oil feeding path 16a. The oil pressure control valve 22 is configured such that an output oil pressure thereof is controlled by a control unit 24.

The control unit 24 is controlled by an engine rotation speed sensor 26, an engine load sensor 28, an oil temperature sensor 30, and an oil pressure sensor 32. A relief valve 34 is provided to allow surplus oil pressure to escape into the oil pan 10 from a part of the oil path between the oil pump 12 and a filter 14 when the oil pressure exceeds a predetermined value. In this configuration, the oil pressure control valve 22 is controlled by the control unit 24.

SUMMARY OF THE INVENTION

Following problems exist in Patent Document 1 and similarly configured prior art. In Patent Document 1, the control means is controlled electronically. It is therefore necessary to obtain a large amount of information, such as the engine rotation speed, the oil temperature, the engine load, and the oil pressure, to control the oil pressure control valve 22. Complicated control such as MAP control and oil temperature correction is also required. As a result, a large cost increase can be foreseen. Moreover, electric power is consumed to drive the oil pressure control valve 22, and therefore the engine load may increase due to the need to drive a power generation apparatus.

Furthermore, when a fault occurs in any of the electric systems, such as the various sensors required for the control, the oil pressure control valve 22, and the control unit 24, the control cannot be performed sufficiently, and therefore expected effects are no longer obtained. An object of the present invention (a technical problem to be solved thereby), therefore, is to provide a control valve with which a high degree of reliability is obtained inexpensively by driving a mechanism hydraulically in order to avoid problems inherent in electronic control.

As a result of a great deal of committed research undertaken by the present inventor to solve the problems described above, a first aspect of the present invention solves these problems by providing a control valve including: a main flow passage; a flow passage sectional area adjustment spool mounted midway in the main flow passage in order to increase and reduce a flow passage sectional area; a downstream side branch flow passage that bifurcates from the main flow passage on a downstream side of a position of the flow passage sectional area adjustment spool; a communicating flow passage for delivering oil from the downstream side branch flow passage toward the flow passage sectional area adjustment spool; a flow passage opening/closing valve mounted between the downstream side branch flow passage and the communicating flow passage in order to connect and cut off the downstream side branch flow passage and the communicating flow passage to and from each other; a flow passage opening/closing spool mounted midway in the communicating flow passage; and an upstream side branch flow passage that bifurcates from the main flow passage on an upstream side of the position of the flow passage sectional area adjustment spool in order to supply an oil pressure to the flow passage opening/closing spool, wherein, in a low rotation region of an engine, the flow passage opening/closing valve cuts off the downstream side branch flow passage from the communicating flow passage so that the flow passage sectional area of the main flow passage is maximized, in a medium rotation region of the engine, the flow passage opening/closing valve connects the downstream side branch flow passage to the communicating flow passage and the flow passage opening/closing spool allows the communicating flow passage to communicate such that the flow passage sectional area adjustment spool is moved by the oil pressure in a direction for reducing the flow passage sectional area of the main flow passage, and in a high rotation region of the engine, the flow passage opening/closing spool blocks the communicating flow passage such that the flow passage sectional area of the main flow passage is maximized.

A second aspect of the present invention solves the problems described above by providing a control valve including: a main flow passage; a flow passage sectional area adjustment spool mounted midway in the main flow passage; a downstream side branch flow passage that bifurcates from the main flow passage on a downstream side of a position of the flow passage sectional area adjustment spool; a communicating flow passage for delivering oil from the downstream side branch flow passage toward the flow passage sectional area adjustment spool; a flow passage opening/closing valve mounted between the downstream side branch flow passage and the communicating flow passage in order to connect and cut off the downstream side branch flow passage and the communicating flow passage to and from each other; a flow passage opening/closing spool mounted midway in the communicating flow passage; and an upstream side branch flow passage that bifurcates from the main flow passage on an upstream side of the position of the flow passage sectional area adjustment spool in order to supply an oil pressure to the flow passage opening/closing spool, wherein the flow passage opening/closing valve connects the downstream side branch flow passage to the communicating flow passage when the oil pressure in the downstream side branch flow passage increases, the flow passage opening/closing spool blocks the communicating flow passage when the oil pressure from the upstream side branch flow passage increases, and the flow passage sectional area adjustment spool is elastically biased such that a flow passage sectional area of the main flow passage shifts to a maximum side, and moves so as to reduce the flow passage sectional area of the main flow passage when the oil pressure from the communicating flow passage increases.

A third aspect of the present invention solves the problems described above by providing the control valve according to the first or second aspect, wherein an oil pressure required for the flow passage opening/closing valve to connect the downstream side branch flow passage to the communicating flow passage is set to be smaller than an oil pressure required for the flow passage opening/closing spool to block the communicating flow passage.

A fourth aspect of the present invention solves the problems described above by providing the control valve according to any one of the first to third aspects, wherein a drain flow passage is provided between a flow passage sectional area adjustment spool chamber in which the flow passage sectional area adjustment spool is mounted and a flow passage opening/closing spool chamber in which the flow passage opening/closing spool is mounted, an exhaust flow passage is formed in the flow passage opening/closing spool chamber, and when the flow passage opening/closing spool blocks the communicating flow passage, the drain flow passage communicates with the exhaust flow passage.

A fifth aspect of the present invention solves the problems described above by providing the control valve according to any one of the first to fourth aspects, wherein the flow passage sectional area adjustment spool chamber in which the flow passage sectional area adjustment spool is mounted is constituted by a main chamber portion and an auxiliary chamber portion, both of which are orthogonal to the main flow passage, and the flow passage sectional area adjustment spool reciprocates between the main chamber portion and the auxiliary chamber portion so as to traverse the main flow passage.

The first and second aspects of the present invention are configured such that the oil pressure on the downstream side of the control valve is controlled in accordance with variation in the engine rotation speed, or in other words variation in the oil pressure in the main flow passage, using only a mechanical hydraulic mechanism and without the use of a solenoid valve, a sensor, or the like that has to be driven electrically.

As a result, the possibility that oil pressure control cannot be performed appropriately due to a fault in an electric system can be eliminated, operational reliability exceeding that of a conventional lubricating oil supply apparatus can be secured, and cost increases caused by the addition of components, control, and so on can be suppressed.

Further, from an operational viewpoint, in the medium rotation region of the engine, the flow passage sectional area of an oil circuit is narrowed by applying oil pressure to the flow passage sectional area adjustment spool so that the flow passage sectional area adjustment spool moves in an axial direction. By narrowing the sectional area of the oil passage, the oil pressure on the downstream side of the flow passage sectional area adjustment spool can be reduced.

Moreover, in the high rotation region of the engine, the oil flowing through the communicating flow passage is blocked by the flow passage opening/closing spool so that the drain flow passage communicates with the exhaust flow passage provided in the flow passage opening/closing spool chamber, and therefore the oil pressure applied to the flow passage sectional area adjustment spool is reduced such that the flow passage sectional area adjustment spool is moved in a direction for maximizing the flow passage sectional area of the main flow passage by the elastic biasing force acting on the flow passage sectional area adjustment spool. As a result, the flow rate and pressure of the oil can be increased in accordance with the rotation speed of the engine.

Hence, in the present invention, the oil pressure can be increased gradually following startup in the low rotation region of the engine without causing the oil pressure on the downstream side to decrease. Further, in the medium rotation region of the engine, an increase in the oil pressure is suppressed, and therefore a wasteful oil action can be prevented. Moreover, when a high oil pressure is required for lubrication and cooling in the high rotation region of the engine, a high oil pressure can be supplied accordingly.

According to the third aspect of the present invention, the oil pressure required by the flow passage opening/closing valve to connect the downstream side branch flow passage to the communicating flow passage is set to be smaller than the oil pressure required by the flow passage opening/closing spool to block the communicating flow passage, and therefore the flow passage opening/closing valve moves before the flow passage opening/closing spool in response to an increase in the oil pressure flowing through the main flow passage. As a result, an appropriate operation corresponding to the rotation speed of the engine can be performed simply by setting the elastic biasing force of the elastic member.

According to the fourth aspect of the present invention, an operation of the flow passage sectional area adjustment spool in a case where the flow passage opening/closing spool blocks the communicating flow passage such that the supply of oil pressure into the flow passage sectional area adjustment spool chamber is stopped can be performed smoothly. According to the fifth aspect of the present invention, the flow passage sectional area adjustment spool reciprocates in the axial direction in a stable condition.

DESCRIPTION OF THE PREFERRED EMBODIMENTS

Figure 6:
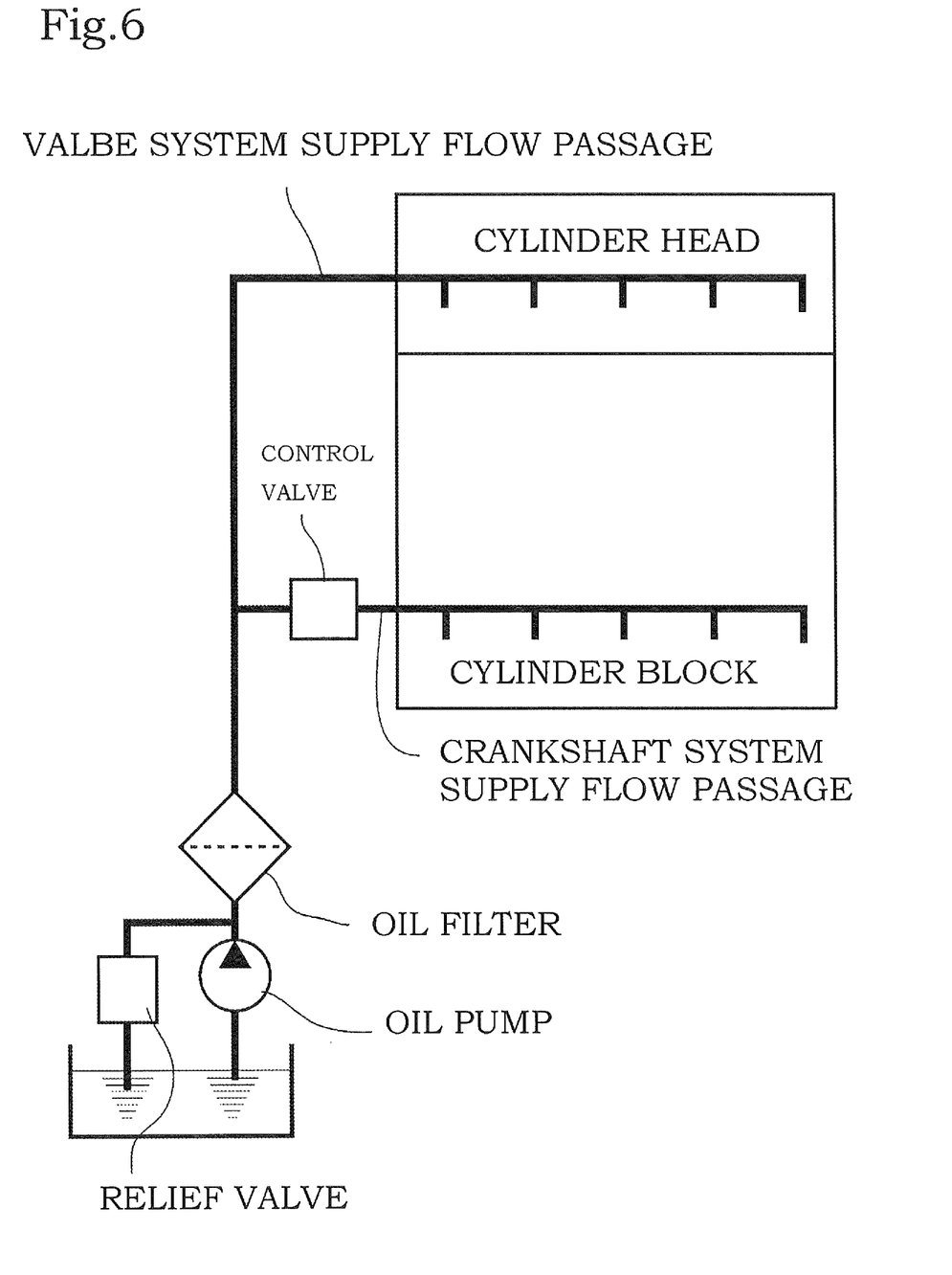
FIG. 6 is a schematic view showing the control valve according to the present invention disposed in an oil circuit.

An embodiment of the present invention will be described below on the basis of the drawings. A control valve according to the present invention is provided in an oil circulation circuit for supplying oil to respective parts of an engine. More specifically, the control valve mainly performs control on oil supplied to a bearing portion of a crankshaft and so on (see FIG. 6).

The control valve according to the present invention is disposed midway in a crankshaft system lubricating circuit within the oil circulation circuit of the engine. The control valve is also applied to control of a valve system lubricating circuit, and in this case, the control valve according to the present invention is disposed midway in the valve system lubricating circuit.

Figure 1A:
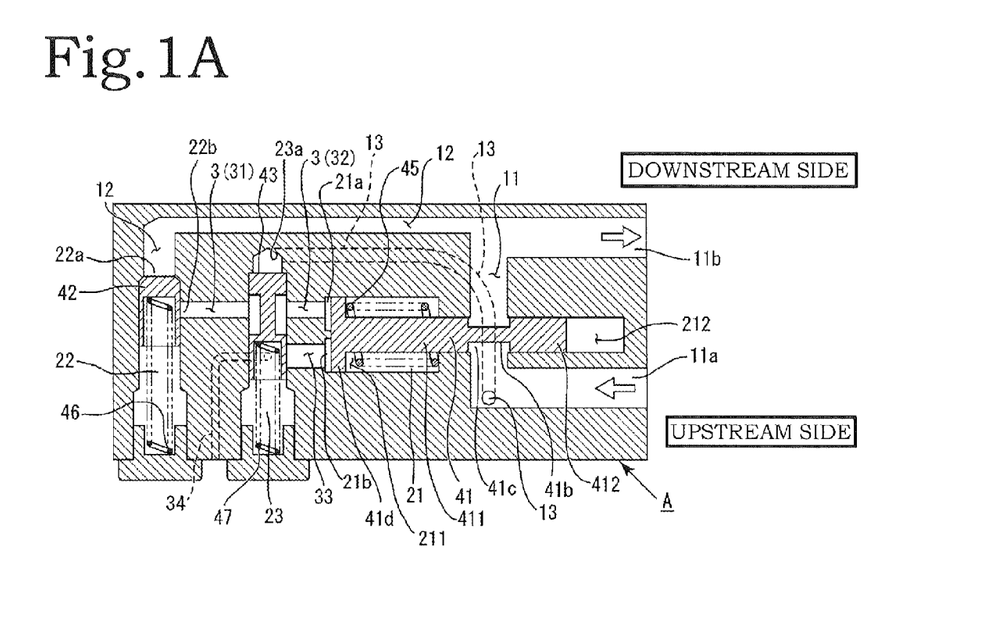
FIG. 1A is a sectional view showing a configuration of a control valve according to the present invention.

The present invention is mainly constituted by a housing A, a flow passage sectional area adjustment spool 41, a flow passage opening/closing valve 42, a flow passage opening/closing spool 43, elastic members 45, 46, 47 for biasing the valves elastically, and so on (see FIG. 1A). A main flow passage 11 is formed in the housing A. The main flow passage 11 forms a part of the oil circulation circuit.

Figure 1B:
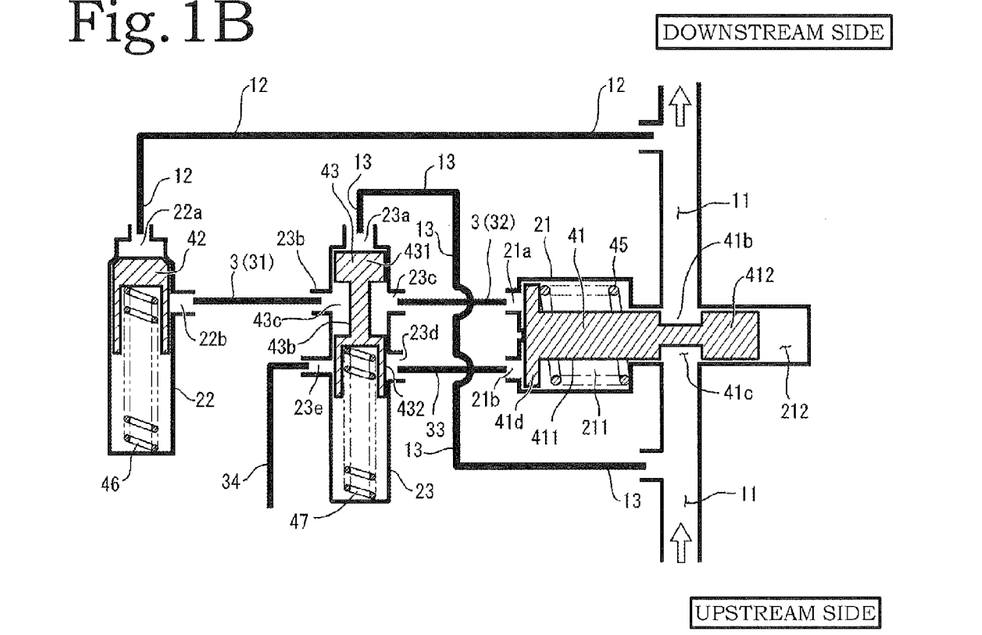
FIG. 1B is a schematic view of the configuration shown in FIG. 1A.

Hence, when the control valve according to the present invention is provided in the crankshaft system lubricating circuit, the main flow passage 11 constitutes a part of the crankshaft system lubricating circuit. FIG. 1B shows a simplified view of an internal structure of the housing A shown in FIG. 1A.

An inflow side connecting end portion 11a and an outflow side connecting end portion 11b are formed in the main flow passage 11 in positions for connecting the housing A to an external oil pipe. Oil flows into the oil circulation circuit through the inflow side connecting end portion 11a, and flows out through the outflow side connecting end portion 11b.

A flow passage sectional area adjustment spool chamber 21, a flow passage opening/closing valve chamber 22, and a flow passage opening/closing spool chamber 23 are formed in the housing A. The flow passage sectional area adjustment spool chamber 21 is formed to traverse the main flow passage 11. More specifically, the flow passage sectional area adjustment spool chamber 21 intersects the main flow passage 11 orthogonally so as to be divided into two chambers by the main flow passage 11.

One of the two chambers will be referred to as a main chamber portion 211, and the other will be referred to as an auxiliary chamber portion 212. The flow passage sectional area adjustment spool 41, to be described below, is mounted in the flow passage sectional area adjustment spool chamber 21. Further, a downstream side branch flow passage 12 is formed to bifurcate from the main flow passage 11 in a position on a downstream side of the flow passage sectional area adjustment spool chamber 21, and an upstream side branch flow passage 13 is formed to bifurcate from the main flow passage 11 in a position on an upstream side of the flow passage sectional area adjustment spool chamber 21. Here, the upstream side and the downstream side correspond respectively to an inflow direction and an outflow direction, regardless of the position from which the control valve is viewed. The oil flows from the upstream side toward the downstream side.

The flow passage opening/closing valve chamber 22 communicates with the downstream side of the main flow passage 11 via the downstream side branch flow passage 12. Further, the flow passage opening/closing spool chamber 23 communicates with the upstream side of the main flow passage 11 via the upstream side branch flow passage 13. More specifically, the downstream side branch flow passage 12 communicates with an apex portion opening 22a formed in an axial direction apex portion of the flow passage opening/closing valve chamber 22, while the upstream side branch flow passage 13 communicates with an apex portion opening 23a formed in an axial direction apex portion of the flow passage opening/closing spool chamber 23.

A communicating flow passage 3 is formed between the flow passage opening/closing valve chamber 22 and the flow passage sectional area adjustment spool chamber 21 such that the flow passage opening/closing valve chamber 22 and the flow passage sectional area adjustment spool chamber 21 communicate with each other via the communicating flow passage 3. The flow passage opening/closing spool chamber 23 is disposed midway in the communicating flow passage 3. In other words, the communicating flow passage 3 is divided into two by the flow passage opening/closing spool chamber 23.

A part of the communicating flow passage 3 between the flow passage opening/closing valve chamber 22 and the flow passage opening/closing spool chamber 23 is set as a first communicating flow passage 31, and a part thereof between the flow passage opening/closing spool chamber 23 and the flow passage sectional area adjustment spool chamber 21 is set as a second communicating flow passage 32.

One side end portion of the first communicating flow passage 31 communicates with a side portion outflow port 22b formed in a side face portion of the flow passage opening/closing valve chamber 22 to be orthogonal to an axial direction thereof. Further, another side end portion of the first communicating flow passage 31 communicates with a side portion inflow port 23b formed in a side face portion of the flow passage opening/closing spool chamber 23 to be orthogonal to an axial direction thereof.

One side end portion of the second communicating flow passage 32 communicates with a side portion outflow port 23c formed in a side face portion of the flow passage opening/closing spool chamber 23 to be orthogonal to the axial direction thereof. Further, another side end portion of the second communicating flow passage 32 communicates with an apex portion inflow port 21a formed in an apex portion of the flow passage sectional area adjustment spool chamber 21 in an axial direction thereof.

Furthermore, a drain flow passage 33 is formed in the axial direction between the flow passage opening/closing spool chamber 23 and the flow passage sectional area adjustment spool chamber 21 in a different position to the second communicating flow passage 32 so as to connect the flow passage opening/closing spool chamber 23 and the flow passage sectional area adjustment spool chamber 21. More specifically, an apex portion outflow port 21b is formed in the apex portion of the flow passage sectional area adjustment spool chamber 21 in a different position to the apex portion inflow port 21a, a drain inflow port 23d is formed in the side face portion of the flow passage opening/closing spool chamber 23, which is orthogonal to the axial direction thereof, in a position rearward of the side portion outflow port 23c in the axial direction, and the drain flow passage 33 is formed between the apex portion outflow port 21b and the drain inflow port 23d.

Further, a drain exhaust port 23e is formed in the flow passage opening/closing spool chamber 23 in an appropriate position that is identical to the drain inflow port 23d in the axial direction and different from the drain inflow port 23d in a circumferential direction. An exhaust flow passage 34 that communicates with the exterior of the housing A is formed to extend from the drain exhaust port 23e.

The flow passage sectional area adjustment spool 41 is disposed in the flow passage sectional area adjustment spool chamber 21. The flow passage sectional area adjustment spool 41 is disposed in the flow passage sectional area adjustment spool chamber 21 to be free to move in the axial direction and so as to traverse the main flow passage 11 substantially orthogonally thereto.

More specifically, one axial direction side part of the flow passage sectional area adjustment spool 41 is disposed in the main chamber portion 211, and another axial direction side part is disposed in the auxiliary chamber portion 212. The flow passage sectional area adjustment spool 41 is capable of moving in the axial direction, and by moving varies a flow passage sectional area of the main flow passage 11, thereby controlling a flow rate of the oil that flows through the main flow passage 11.

The flow passage sectional area adjustment spool 41 is constituted by a first sliding portion 411 inserted into the main chamber portion 211, a second sliding portion 412 inserted into the auxiliary chamber portion 212, a constricted portion 41b that links the first sliding portion 411 to the second sliding portion 412, and a large diameter jaw-like portion 41d.

Respective outer diameters of the first sliding portion 411 and the second sliding portion 412 are formed to be substantially equal to or slightly smaller than an inner diameter of the main flow passage 11. The constricted portion 41b is formed to be smaller than the outer diameters of the first sliding portion 411 and the second sliding portion 412. Further, the large diameter jaw-like portion 41d is formed on an end portion of the first sliding portion 411 and formed to be larger than the outer diameter of the first sliding portion 411. A void portion 41c is formed on a periphery of the constricted portion 41b.

The elastic member 45 applies an elastic biasing force to the flow passage sectional area adjustment spool 41 so that the constricted portion 41b traverses the main flow passage 11, whereby a flow passage sectional area of the main flow passage 11 is maximized. This condition is set as an initial condition of the flow passage sectional area adjustment spool 41. At this time, the oil in the main flow passage 11 flows through the void portion 41c between the constricted portion 41b and an inner wall of the main flow passage 11. A coil spring is used mainly as an embodiment of the elastic member 45.

When the oil flows into the flow passage sectional area adjustment spool chamber 21 through the apex portion inflow port 21a, the large diameter jaw-like portion 41d of the flow passage sectional area adjustment spool 41 is pressed by pressure from the oil flowing through the communicating flow passage 3, whereby the flow passage sectional area adjustment spool 41 moves in the direction of the auxiliary chamber portion 212 of the flow passage sectional area adjustment spool chamber 21 against the elastic biasing force of the elastic member 45.

As a result, the first sliding portion 411 in the main chamber portion 211 of the flow passage sectional area adjustment spool chamber 21 projects into the main flow passage 11, thereby reducing the flow passage sectional area of the main flow passage 11 from the maximum condition such that an amount of oil supplied to the downstream side of the flow passage sectional area adjustment spool chamber 21 decreases. Further, the first sliding portion 411 reduces the flow passage sectional area of the main flow passage 11 but does not block the oil flow completely, and therefore the flow rate of the oil is only reduced.

The flow passage opening/closing valve 42 is disposed in the flow passage opening/closing valve chamber 22. The flow passage opening/closing valve 42 serves to cut off and connect the downstream side branch flow passage 12 and the first communicating flow passage 31 of the communicating flow passage 3 from and to each other.

The flow passage opening/closing valve 42 is normally pressed toward an apex portion location in the axial direction of the flow passage opening/closing valve chamber 22 by an elastic biasing force of the elastic member 46 so as to be positioned in an apex portion location of the flow passage opening/closing valve chamber 22. This condition is set as an initial condition of the flow passage opening/closing valve 42. When the flow passage opening/closing valve 42 is in the initial condition, the downstream side branch flow passage 12 is cut off from the first communicating flow passage 31.

The flow passage opening/closing spool 43 is disposed in the flow passage opening/closing spool chamber 23. The flow passage opening/closing spool 43 serves to cut off and connect the first communicating flow passage 31 and the second communicating flow passage 32 constituting the communicating flow passage 3 from and to each other.

The flow passage opening/closing spool 43 is constituted by a first sliding portion 431, a second sliding portion 432, and a constricted portion 43b that links the first sliding portion 431 to the second sliding portion 432 and has a smaller diameter than respective outer diameters of the first sliding portion 431 and the second sliding portion 432. A void portion 43c is formed by the constricted portion 43b and an inner wall of the flow passage opening/closing spool chamber 23.

The flow passage opening/closing spool 43 is normally pressed toward an apex portion location of the flow passage opening/closing spool chamber 23 by an elastic biasing force of the elastic member 47 so as to be positioned in an apex portion location of the flow passage opening/closing spool chamber 23. This condition is set as an initial condition of the flow passage opening/closing spool 43. Coil springs are used mainly as the elastic member 46 and the elastic member 47.

When the flow passage opening/closing spool 43 is positioned in the apex portion location of the flow passage opening/closing spool chamber 23, or in other words in the initial condition, the constricted portion 43b is positioned in alignment with the side portion inflow port 23b and the side portion outflow port 23c. Accordingly, the side portion inflow port 23b and the side portion outflow port 23c are opened via the void portion 43c such that the first communicating flow passage 31 and the second communicating flow passage 32 communicate with each other.

When the oil flows into the upstream side branch flow passage 13 communicating with the apex portion of the flow passage opening/closing spool chamber 23 such that the oil pressure increases, the flow passage opening/closing spool 43 moves against the elastic biasing force of the elastic member 47. When the first sliding portion 431 reaches the position of the side portion inflow port 23b and the side portion outflow port 23c, the side portion inflow port 23b and the side portion outflow port 23c are closed such that the first communicating flow passage 31 and the second communicating flow passage 32 are cut off from each other. As a result, the oil flow from the communicating flow passage 3 into the flow passage sectional area adjustment spool chamber 21 is stopped.

The elastic member 45 applies an elastic biasing force to the flow passage sectional area adjustment spool 41 so that the constricted portion 41b traverses the main flow passage 11. When the oil flows into the flow passage sectional area adjustment spool chamber 21 from the second communicating flow passage 32, the large diameter jaw-like portion 41d of the flow passage sectional area adjustment spool 41 is pressed so as to move against the elastic biasing force of the elastic member 45.

Next, operations relating to the present invention, which are performed mainly in a low rotation region, a medium rotation region, and a high rotation region of the engine, will be described. Note that the low rotation region of the engine includes idling (also known as idle rotation). From the low rotation region to the high rotation region, vehicle travel is underway, and therefore a load is applied to the engine. In the idling region, however, the vehicle is stationary, and therefore no load is applied to the engine.

Figure 2A:
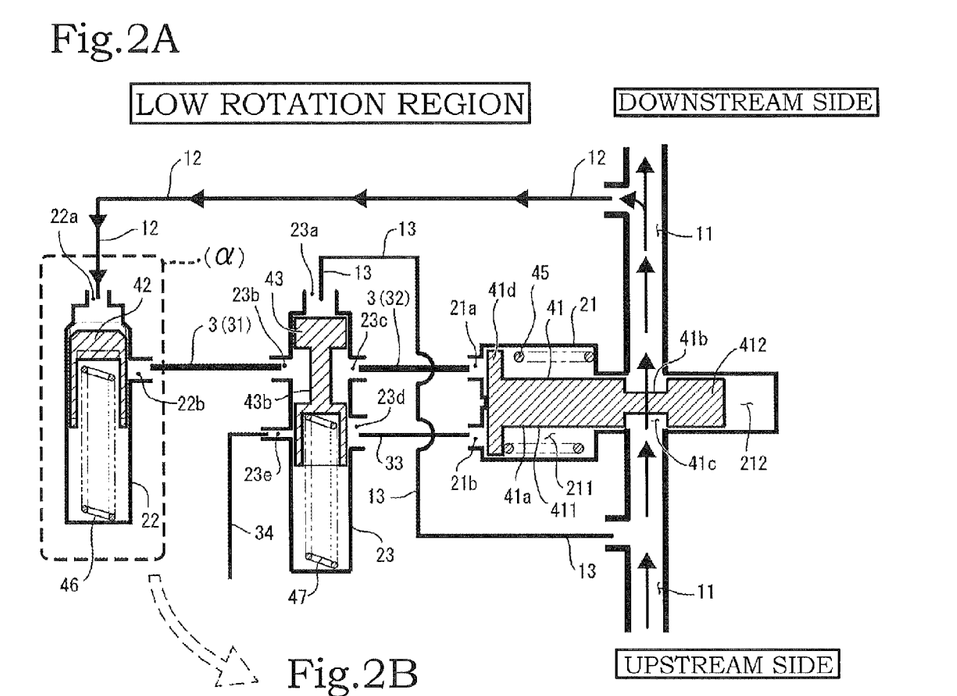
FIG. 2A is a schematic view showing an action of the control valve in a low rotation region of an engine.
Figure 2B:
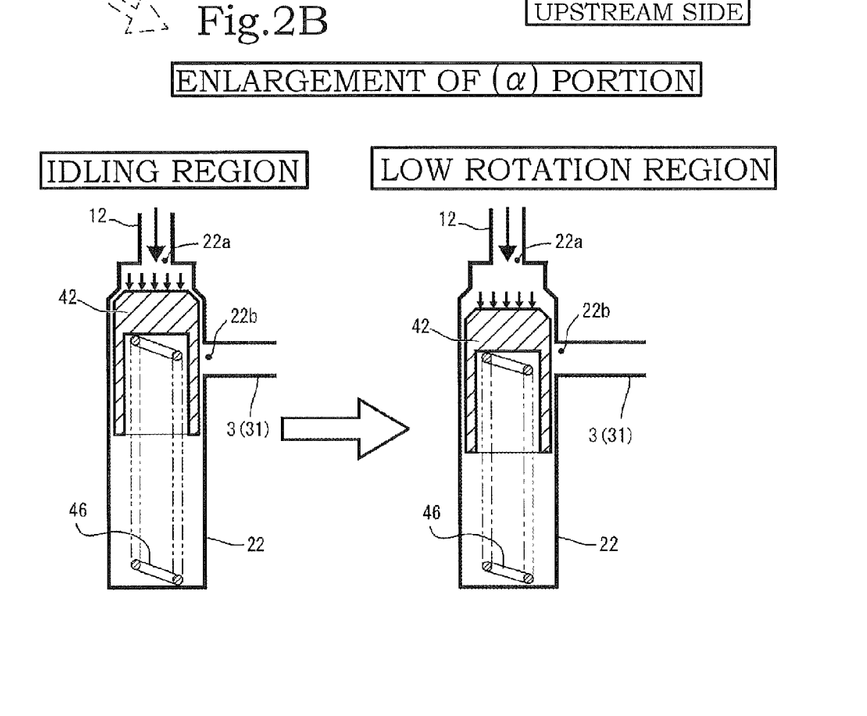
FIG. 2B is a schematic view showing an operation from an idling region to the low rotation region in an (a) portion of FIG. 2A.

In the low rotation region of the engine, as shown in FIG. 2A, the flow passage sectional area adjustment spool 41 is set in the initial condition by the elastic member 45. In other words, only the constricted portion 41b traverses the main flow passage 11, and therefore the flow passage sectional area is maximized. The oil flows from the upstream side toward the downstream side through the void portion 41c on the periphery of the constricted portion 41b of the flow passage sectional area adjustment spool 41. FIG. 2B shows an operation of the flow passage opening/closing valve 42 from the idling region to the low rotation region of the engine.

As shown in FIG. 2B, the oil flowing through the main flow passage 11 flows into the downstream side branch flow passage 12 and the upstream side branch flow passage 13, but since the oil pressure is considerably smaller than the elastic biasing force of the elastic members 46, 47, the flow passage opening/closing valve 42 and the flow passage opening/closing spool 43 do not perform opening/closing operations. Therefore, an oil pressure on the downstream side of the flow passage sectional area adjustment spool 41, or in other words a crankshaft system supply oil pressure, and an oil pressure on the upstream side of the flow passage sectional area adjustment spool 41, or in other words a valve system supply oil pressure, are substantially equal.

Furthermore, in the low rotation region of the engine, control for reducing the oil pressure is not performed. As a result, a sufficient oil pressure and a sufficient flow rate can be secured even in a region where a rotation speed is low and a pump discharge amount is inherently small.

Figure 3A:
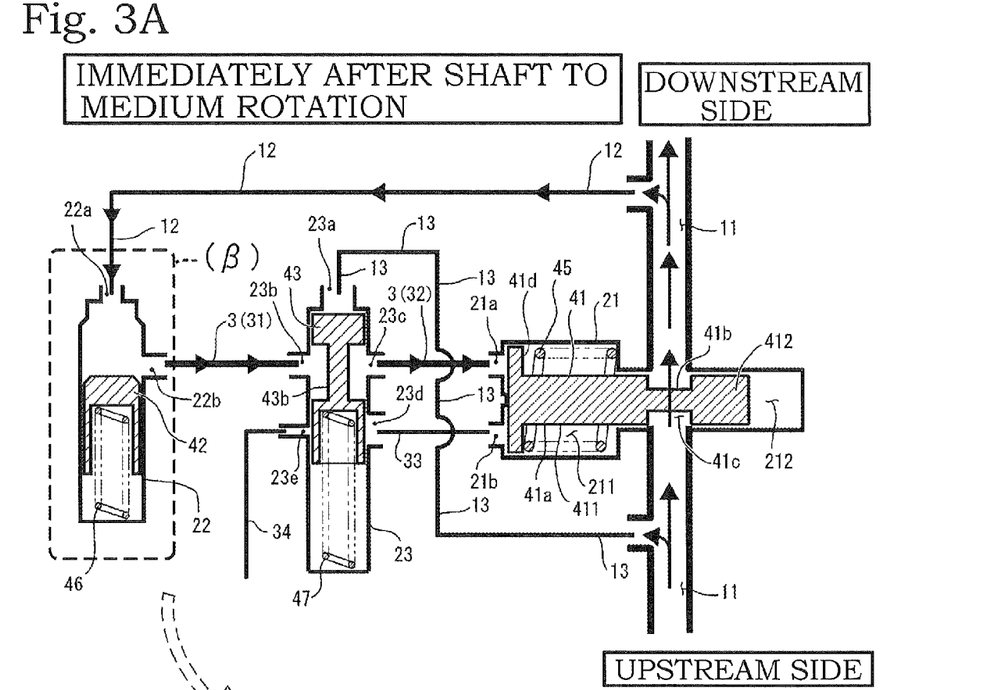
FIG. 3A is a schematic view showing an action of the control valve immediately after the engine shifts to medium rotation.

A condition in which the engine is in the medium rotation region will now be described. Immediately after a shift from the low rotation region to the medium rotation region, the pressure of the oil flowing into the downstream side branch flow passage 12 from the main flow passage 11 increases (see FIG. 3A). Note that the low rotation region shown in FIG. 2B and the low rotation region shown in FIG. 3B illustrate identical conditions.

Figure 3B:
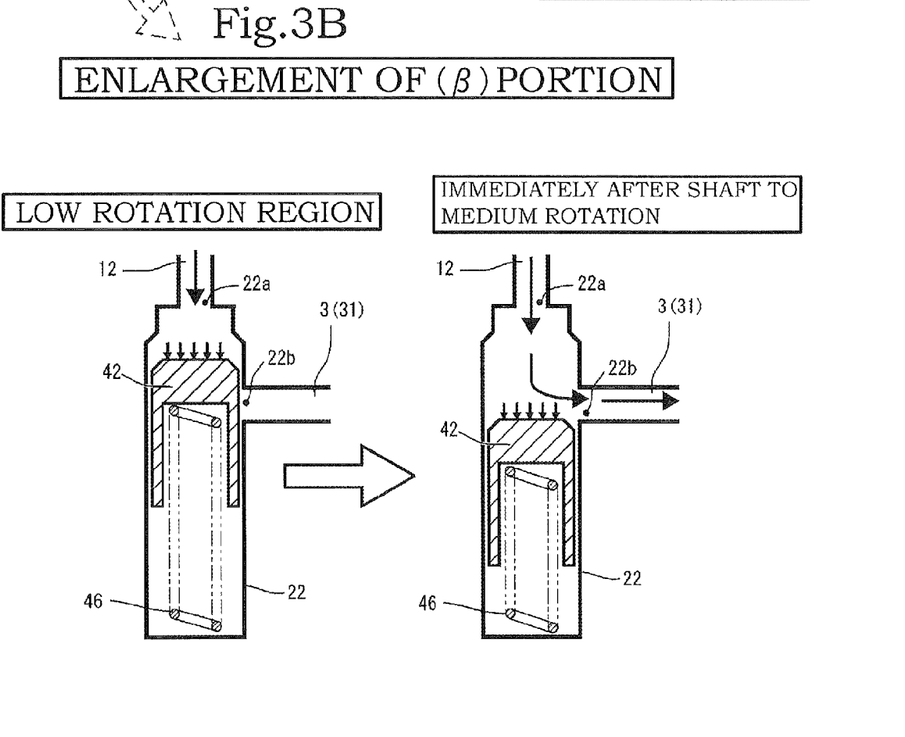
FIG. 3B is a schematic view showing an operation from the low rotation region to a point immediately after the shift to medium rotation in a (β) portion of FIG. 3A.

When the oil pressure increases immediately after the shift from the low rotation region to the medium rotation region, the flow passage opening/closing valve 42 is pressed against the elastic biasing force of the elastic member 46 that biases the flow passage opening/closing valve 42 elastically, whereby the flow passage opening/closing valve 42 moves through the flow passage opening/closing valve chamber 22 in the direction of the elastic member 46 (see FIG. 3B). As a result, the apex portion opening 22a and the side portion outflow port 22b of the flow passage opening/closing valve chamber 22 communicate with each other such that the downstream side branch flow passage 12 communicates with the first communicating flow passage 31 of the communicating flow passage 3.

The oil flowing through the main flow passage 11 also flows into the upstream side branch flow passage 13, but the pressure of the oil on the upstream side in the medium rotation region is smaller than the elastic biasing force of the elastic member 47 that elastically biases the flow passage opening/closing spool 43, and therefore the flow passage opening/closing spool 43 remains substantially immobile.

In this condition, the flow passage opening/closing spool chamber 23 is maintained substantially in the initial condition, in which the constricted portion 43b of the flow passage opening/closing spool 43 is positioned in the position of the side portion inflow port 23b and the side portion outflow port 23c of the flow passage opening/closing spool chamber 23 such that the side portion inflow port 23b and the side portion outflow port 23c are open.

Figure 4A:
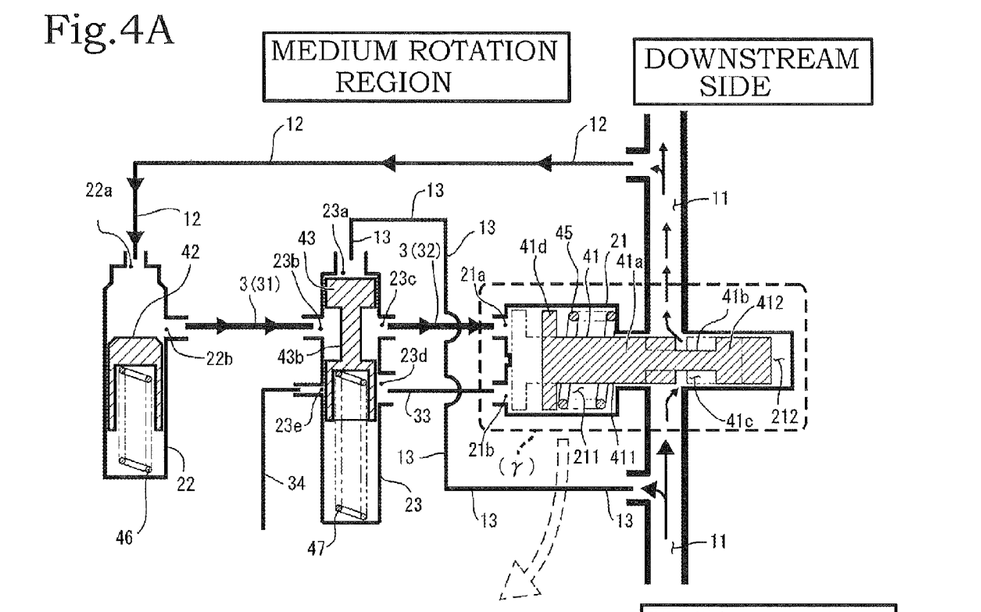
FIG. 4A is a schematic view showing an action of the control valve in a medium rotation region of the engine.

Accordingly, the downstream side branch flow passage 12, the first communicating flow passage 31, and the second communicating flow passage 32 communicate with each other such that the oil passes through the downstream side branch flow passage 12 and the communicating flow passage 3 (the first communicating flow passage 31 and the second communicating flow passage 32) and flows into the flow passage sectional area adjustment spool chamber 21 through the apex portion inflow port 21a. Further, at this time, the drain inflow port 23d and the drain exhaust port 23e of the flow passage opening/closing spool chamber 23 are closed by the second sliding portion 432 of the flow passage opening/closing spool 23 (see FIG. 4A).

Figure 4B:
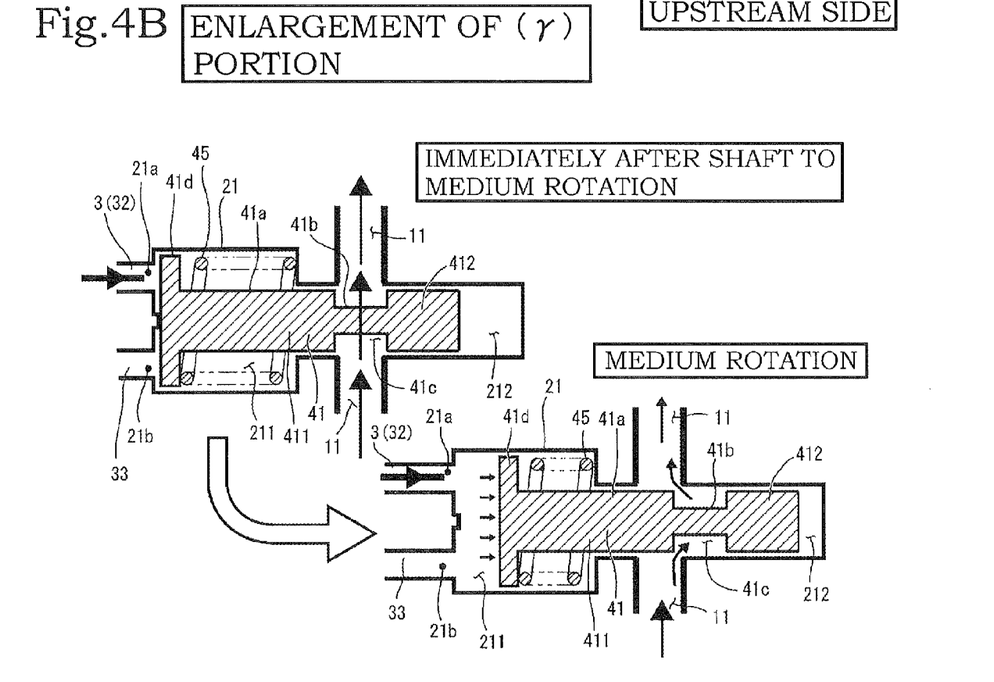
FIG. 4B is a schematic view showing an operation from the point immediately after the shift to medium rotation to the medium rotation region in a (γ) portion of FIG. 4A.

Hence, the oil cannot flow out through the apex portion outflow port 21b of the flow passage sectional area adjustment spool chamber 21. Therefore, when the engine is in the medium rotation region (excluding a point immediately after a shift from the low rotation region to the medium rotation region) and the high rotation region, the flow passage sectional area adjustment spool 41 is moved against the elastic biasing force of the elastic member 45 by the pressure of the oil flowing in through the apex portion inflow port 21a (see FIG. 4B). As a result, the part of the flow passage sectional area adjustment spool 41 traversing the main flow passage 11 shifts from the constricted portion 41b to the first sliding portion 411, leading to a reduction in the flow passage sectional area of the main flow passage 11.

In other words, when the flow passage sectional area adjustment spool 41 moves, the first sliding portion 411 reduces the flow passage sectional area of the main flow passage 11 so as to serve as an orifice. Accordingly, the flow rate of the oil flowing through the main flow passage 11 from the upstream side to the downstream side decreases.

However, the flow of oil is not completely stopped, but only reduced, and therefore a slight flow is maintained. Hence, when the flow passage sectional area of the main flow passage 11 decreases, the oil pressure on the downstream side of the control valve (equivalent to the crankshaft system supply oil pressure) becomes smaller than the oil pressure on the upstream side of the control valve (equivalent to the valve system supply oil pressure).

Figure 5A:
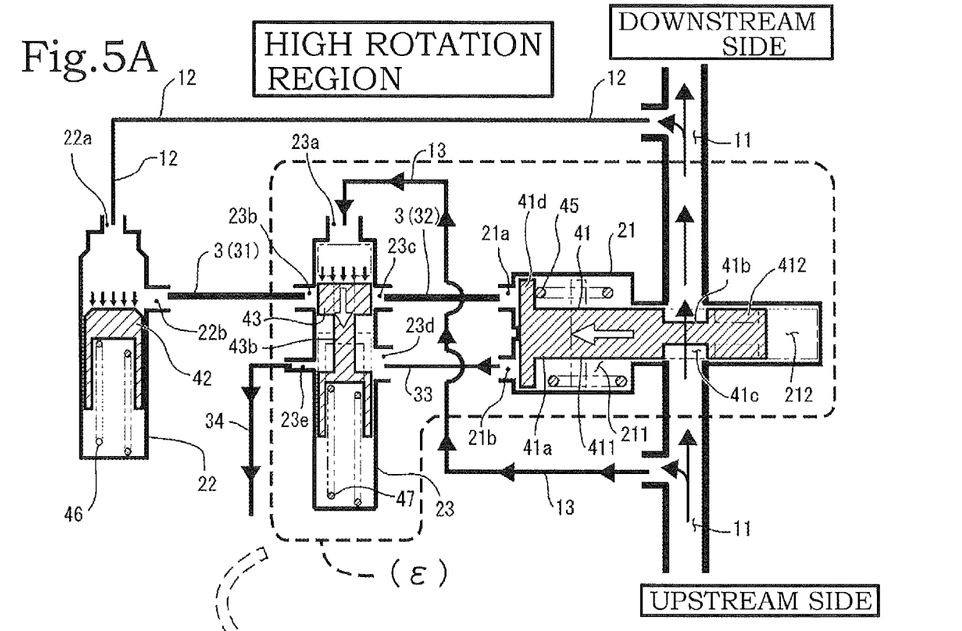
FIG. 5A is a schematic view showing an action of the control valve in a high rotation region of the engine.

When the engine is in the high rotation region, the oil pressure on the upstream side of the main flow passage 11 increases beyond that of the medium rotation region, and therefore the oil pressure supplied to the flow passage opening/closing spool chamber 23 from the main flow passage 11 via the upstream side branch flow passage 13 also increases (see FIG. 5A). As a result, the flow passage opening/closing spool 43 moves in the direction of the elastic member 47 against the elastic biasing force of the elastic member 47.

Figure 5B:
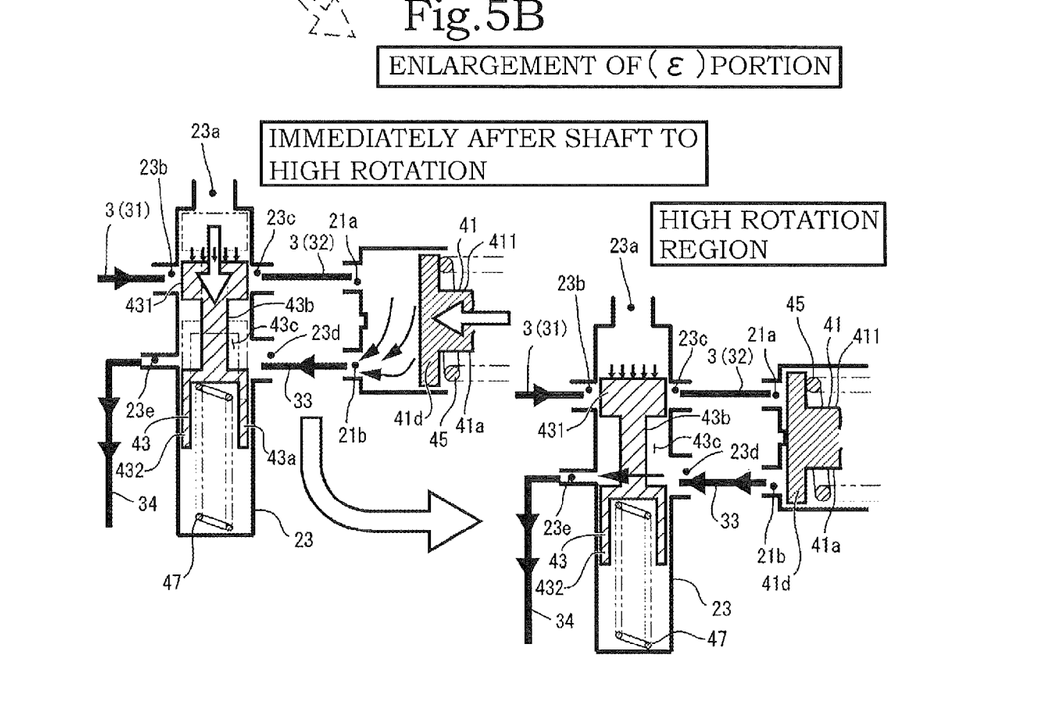
FIG. 5B is a schematic view showing an operation from a point immediately after a shift to high rotation to the high rotation region in an (s) portion of FIG. 5A.

When the engine moves into the high rotation region from a point immediately after a shift to high rotation, the first sliding portion 431 of the flow passage opening/closing spool 43 blocks the side portion inflow port 23b and the side portion outflow port 23c of the flow passage opening/closing spool chamber 23, and simultaneously, the constricted portion 43b reaches the position of the drain inflow port 23d and the drain exhaust port 23e such that the drain inflow port 23d and the drain exhaust port 23e are opened (see FIG. 5B).

As a result, the flow passage sectional area adjustment spool 41 is pressed by the elastic biasing force of the elastic member 45 such that the accumulated oil in the flow passage sectional area adjustment spool chamber 21 flows into the drain inflow port 23d of the flow passage opening/closing spool chamber 23 from the apex portion outflow port 21b via the drain flow passage 33. The inflowing oil then flows out of the drain exhaust port 23e into the exhaust flow passage 34 so as to be discharged to the exterior of the housing A. Hence, the flow passage sectional area adjustment spool 41 can be returned to its initial position smoothly.

What is claimed is:

1. A control valve comprising:
   a main flow passage;
   a flow passage sectional area adjustment spool mounted midway in the main flow passage in order to increase and reduce a flow passage sectional area;
   a downstream side branch flow passage that bifurcates from the main flow passage on a downstream side of a position of the flow passage sectional area adjustment spool;
   a communicating flow passage for delivering oil from the downstream side branch flow passage toward the flow passage sectional area adjustment spool;
   a flow passage opening/closing valve mounted between the downstream side branch flow passage and the communicating flow passage in order to connect and cut off the downstream side branch flow passage and the communicating flow passage to and from each other;
   a flow passage opening/closing spool mounted midway in the communicating flow passage; and
   an upstream side branch flow passage that bifurcates from the main flow passage on an upstream side of the position of the flow passage sectional area adjustment spool in order to supply an oil pressure to the flow passage opening/closing spool,
   wherein, in a low rotation region of an engine, the flow passage opening/closing valve cuts off the downstream side branch flow passage from the communicating flow passage so that the flow passage sectional area of the main flow passage is maximized,
   in a medium rotation region of the engine, the flow passage opening/closing valve connects the downstream side branch flow passage to the communicating flow passage and the flow passage opening/closing spool allows the communicating flow passage to communicate such that the flow passage sectional area adjustment spool is moved by the oil pressure in a direction for reducing the flow passage sectional area of the main flow passage, and
   in a high rotation region of the engine, the flow passage opening/closing spool blocks the communicating flow passage such that the flow passage sectional area of the main flow passage is maximized.

2. A control valve comprising:
   a main flow passage;
   a flow passage sectional area adjustment spool mounted midway in the main flow passage;
   a downstream side branch flow passage that bifurcates from the main flow passage on a downstream side of a position of the flow passage sectional area adjustment spool;
   a communicating flow passage for delivering oil from the downstream side branch flow passage toward the flow passage sectional area adjustment spool;
   a flow passage opening/closing valve mounted between the downstream side branch flow passage and the communicating flow passage in order to connect and cut off the downstream side branch flow passage and the communicating flow passage to and from each other;
   a flow passage opening/closing spool mounted midway in the communicating flow passage; and
   an upstream side branch flow passage that bifurcates from the main flow passage on an upstream side of the position of the flow passage sectional area adjustment spool in order to supply an oil pressure to the flow passage opening/closing spool,
   wherein the flow passage opening/closing valve connects the downstream side branch flow passage to the communicating flow passage when the oil pressure in the downstream side branch flow passage increases,
   the flow passage opening/closing spool blocks the communicating flow passage when the oil pressure from the upstream side branch flow passage increases, and
   the flow passage sectional area adjustment spool is elastically biased such that a flow passage sectional area of the main flow passage shifts to a maximum side, and moves so as to reduce the flow passage sectional area of the main flow passage when the oil pressure from the communicating flow passage increases.

3. The control valve according to claim 1, wherein an oil pressure required for the flow passage opening/closing valve to connect the downstream side branch flow passage to the communicating flow passage is set to be smaller than an oil pressure required for the flow passage opening/closing spool to block the communicating flow passage.

4. The control valve according to claim 1, wherein a drain flow passage is provided between a flow passage sectional area adjustment spool chamber in which the flow passage sectional area adjustment spool is mounted and a flow passage opening/closing spool chamber in which the flow passage opening/closing spool is mounted,
   an exhaust flow passage is formed in the flow passage opening/closing spool chamber, and
   when the flow passage opening/closing spool blocks the communicating flow passage, the drain flow passage communicates with the exhaust flow passage.

5. The control valve according to claim 1, wherein the flow passage sectional area adjustment spool chamber in which the flow passage sectional area adjustment spool is mounted is constituted by a main chamber portion and an auxiliary chamber portion, both of which are orthogonal to the main flow passage, and
   the flow passage sectional area adjustment spool reciprocates between the main chamber portion and the auxiliary chamber portion so as to traverse the main flow passage.

6. The control valve according to claim 2, wherein an oil pressure required for the flow passage opening/closing valve to connect the downstream side branch flow passage to the communicating flow passage is set to be smaller than an oil pressure required for the flow passage opening/closing spool to block the communicating flow passage.

7. The control valve according to claim 2, wherein a drain flow passage is provided between a flow passage sectional area adjustment spool chamber in which the flow passage sectional area adjustment spool is mounted and a flow passage opening/closing spool chamber in which the flow passage opening/closing spool is mounted,
   an exhaust flow passage is formed in the flow passage opening/closing spool chamber, and
   when the flow passage opening/closing spool blocks the communicating flow passage, the drain flow passage communicates with the exhaust flow passage.

8. The control valve according to claim 3, wherein a drain flow passage is provided between a flow passage sectional area adjustment spool chamber in which the flow passage sectional area adjustment spool is mounted and a flow passage opening/closing spool chamber in which the flow passage opening/closing spool is mounted, an exhaust flow passage is formed in the flow passage opening/closing spool chamber, and when the flow passage opening/closing spool blocks the communicating flow passage, the drain flow passage communicates with the exhaust flow passage.

9. The control valve according to claim 2, wherein the flow passage sectional area adjustment spool chamber in which the flow passage sectional area adjustment spool is mounted is constituted by a main chamber portion and an auxiliary chamber portion, both of which are orthogonal to the main flow passage, and the flow passage sectional area adjustment spool reciprocates between the main chamber portion and the auxiliary chamber portion so as to traverse the main flow passage.

10. The control valve according to claim 3, wherein the flow passage sectional area adjustment spool chamber in which the flow passage sectional area adjustment spool is mounted is constituted by a main chamber portion and an auxiliary chamber portion, both of which are orthogonal to the main flow passage, and the flow passage sectional area adjustment spool reciprocates between the main chamber portion and the auxiliary chamber portion so as to traverse the main flow passage.

11. The control valve according to claim 4, wherein the flow passage sectional area adjustment spool chamber in which the flow passage sectional area adjustment spool is mounted is constituted by a main chamber portion and an auxiliary chamber portion, both of which are orthogonal to the main flow passage, and the flow passage sectional area adjustment spool reciprocates between the main chamber portion and the auxiliary chamber portion so as to traverse the main flow passage.

* * * * *